Figure 1:
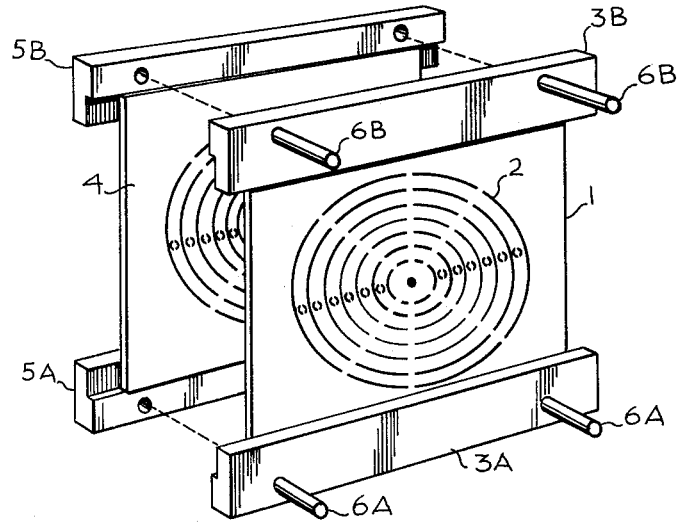

Nov. 10, 1964    M. E. HARRISON ETAL    3,156,563
METHOD OF PRODUCING ACCURATELY ALIGNED PATTERNS
ON OPPOSITE SIDES OF A WORK PIECE
Filed April 22, 1959

MICHAEL E. HARRISON
JOHN E. FITZGERALD
INVENTORS

BY

ATTORNEYS

3,156,563
METHOD OF PRODUCING ACCURATELY ALIGNED PATTERNS ON OPPOSITE SIDES OF A WORK PIECE
Michael E. Harrison, Redondo Beach, and John E. Fitzgerald, Manhattan Beach, Calif., assignors to Thompson Ramo Wooldridge Inc., Los Angeles, Calif., a corporation of Ohio
Filed Apr. 22, 1959, Ser. No. 808,085
4 Claims. (Cl. 96—36)

This invention relates to a new and improved method for the fabrication of mechanical parts by etching.

In the fabrication of mechanical parts from relatively thin sheet metal, it is well known to impress photographically a pattern upon a work piece by coating the work piece with a photosensitive reagent resistant material, exposing the coated work piece to a source of light through an image carrier bearing a desired pattern, developing the work piece to remove the photosensitive material from unexposed areas, and subsequently applying an etching reagent to the developed work piece to etch away the areas of the work piece corresponding to the pattern on the image carrier.

One of the problems arising in the use of the above process is that the etching reagent not only operates to remove material in a direction normal to the surface of the material but also removes material in a direction parallel to the surface of the material beneath the region protected by the developed reagent resistant material. The result is that a certain amount of undercutting takes place which is undesirable.

The problem of undercutting is particularly objectionable where the etching process is allowed to continue for a long enough period to etch completely through the work piece to form apertures or boundaries of the mechanical part being fabricated. For example, in the fabrication of reticles for use in apparatus in which the reticles are rotated at relatively high speeds, the undercutting occurring when the part is etched from one side only produces a mechanical imbalance since on the undercut side of the reticle there is less material present than on the side of the reticle upon which the developed reagent resistant material establishes the etching pattern. Further, where a reticle or other mechanical part formed by an etching process is employed in an optical system, an aberration may occur since the undercutting produces a larger and less well defined pattern on one side than the pattern produced on the opposite side.

In an effect to overcome the effects of undercutting, it is well known in the art to apply a reagent resistant material such as resin to the etched areas when midway through the etching process to retard the etching away of the material on the periphery of the etched pattern in a direction parallel to the surface of the work piece. Another technique which has been proposed is the impression of like registered images on opposite sides of the work piece with the etching taking place from opposite sides so that well defined edges of the patterns are present on both sides of the work piece. However, in every known prior art arrangement in which etching takes place from opposite sides of a work piece, it has been necessary to align visually a pair of image carriers to produce the desired registration between the patterns. Visual registration of the type required for the precision fabrication of mechanical parts requires a high degree of skill. Even though alignment marks or the like are employed, the results have generally not been satisfactory where a high degree of precision in the finished mechanical part is required.

Accordingly, it is one object of the present invention to provide a new and improved method for the fabrication of work pieces etched from opposite sides in aligned patterns.

It is another object of the present invention to provide a new and improved method of fabricating a jig having aligned patterns for use in impressing aligned images on opposite sides of a work piece.

It is yet another object of the present invention to provide a new and improved method for the precision fabrication of mechanical parts from sheet metal which does not require any special skill in registering either the work piece or the patterns impressed thereon.

Briefly, in accordance with one aspect of the present invention, there is provided a method for fabricating precision work pieces from sheet metal in which an image carrier is prepared bearing a desired pattern, the image carrier is affixed to one-half of a two-piece registering jig, a direct positive photographic plate is affixed to the other half of the two-piece registering jig, the two halves of the jig are joined, and the direct positive photographic plate is exposed through the image carrier. The jig is then separated and the direct positive plate is developed with one-half of the jig remaining attached thereto. Next, the two halves of the jig are rejoined about a work piece having surfaces coated with a photosensitive reagent resistant material, and both sides of the work piece are exposed through the image carrier and the direct positive photographic plate, respectively. The work piece is then removed from the jig and developed to remove the reagent resistant material from the unexposed areas so that like aligned patterns of developed photosensitive reagent resistant materials remain on opposite surfaces of the work piece, and the work piece is placed in contact with an etching reagent to remove material, in accordance with the pattern established by the boundaries of the reagent resistant material. Thus, aligned etched patterns may be formed on opposite sides of a work piece having sharp boundary edges defined by the reagent resistant material, with the etched patterns being accurately aligned on both sides of the work piece. Where the etching is allowed to continue until the material is removed clear through the work piece, an aperture or boundary edge of a mechanical part may be achieved having accurately defined sharp edges suitable for use wherever an accurate configuration is required. Thus, the method of the invention is particularly advantageous in the fabrication of reticles which require a high degree of mechanical balance and optical precision.

Figure 2:
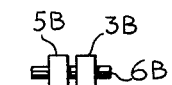
Figure 3:
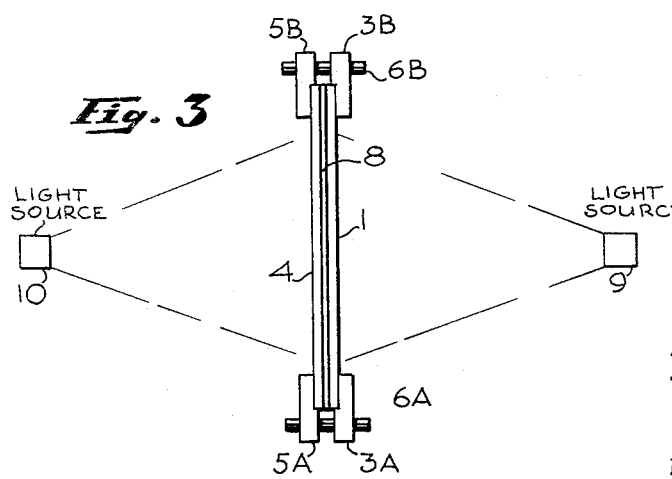

A better understanding of the invention may be had from a reading of the following detailed description and an inspection of the drawings, in which:

FIG. 1 is a perspective view of a two-piece registering jig with photographic plates attached thereto which may be employed in accordance with the method of the invention;

FIG. 2 is a diagrammatic illustration of a two-piece registering jig and a light source which may be employed in the preparation of aligned patterns on photographic plates in accordance with the method of the invention; and FIG. 3 is a diagrammatic illustration of a two-piece registering jig and two light sources which may be employed in impressing aligned patterns upon a work piece in accordance with the method of the invention.

In accordance with the method of the invention, an arrangement similar to that of FIG. 1 may be employed in which an image carrier 1 bears a pattern 2 which is opaque to the passage of light. The image carrier 1 may comprise a conventional photographic plate which is exposed in a suitable optical system in which a photographic image is formed on the plate corresponding to a desired pattern. Where a conventional photographic negative is first made of the desired image, the image carrier 1 may comprise a direct positive photographic plate which is contact printed in engagement with the negative so that the pattern 2 is a negative image of the originally photographed pattern. In accordance with the method of the invention, the image carrier 1 may be affixed to one-half of a two-piece registering jig. In the registering jig of FIG. 1, the image carrier 1 is affixed to jig elements 3A and 3B which may be recessed in the manner shown to receive the edges of the image carrier. In practice, the image carrier 1 may be cemented to the elements 3A and 3B by any suitable cementing compound which should preferably be insoluble to chemicals used in developing images formed upon a direct positive photographic plate.

In accordance with the next step of the method of the invention, a second direct positive photographic plate 4 is affixed to the jig elements 5A and 5B using a suitable cementing compound which in this case must be insoluble in the chemicals used to develop a direct positive photographic plate. The two halves of the registering jig are then joined together by means of the pins 6A and 6B which are thrust through matching holes in the jig elements 3A and 5A and the jig elements 3B and 5B. The holes in the jig elements may be accurately positioned by well known machining operations with the pins 6A and 6B being coated with lanolin or other suitable lubricating material so as to be readily pressed through the mating holes to maintain the two halves of the registering jig in accurate alignment. Where the various jig elements are assembled before the cement holding the photographic plate 4 to the jig elements 5A and 5B has set, a certain amount of misalignment may be readily compensated for by a slight movement of the jig elements 5A or 5B relative to the photographic plate 4. Thus, as soon as the cementing compound holding the photographic plate 4 to the jig elements 5A and 5B is set, a fixed alignment is established between the image carrier 1 and the photographic plate 4.

The next step in practicing the method, in accordance with the invention, is to expose the direct positive photographic plate 4 through the image carrier 1 as illustrated in FIG. 2. With the various jig elements being joined, the emulsion of the photographic plate 4 is placed in direct contact with the emulsion or other image carrying portion of the image carrier 1. It should be noted that the jig elements 5A, 5B, 3A and 3B are recessed in a manner in which the surfaces of the photographic plate 4, and the image carrier 1 may be engaged without interference from the jig elements. This is accomplished by forming the recess in each of the jig elements to a depth less than the thickness of the image carrier 1 and the photographic plate 4 so that when the two halves of the registering jig are joined there is a space between the jig elements 3A and 5A and similarly between the jig elements 3B and 5B. As illustrated in FIG. 2, the direct positive photographic plate 4 is exposed through the image carrier 1 from a light source 7 so that the pattern 2 is impressed upon the emulsion of the photographic plate 4. The two halves of the registering jig are then separated with the photographic plate 4 being developed in a well known manner with the jig elements 5A and 5B remaining attached thereto. By utilizing a direct positive photographic plate, the image formed upon the plate 4 is substantially identical to and aligned with the image 2 borne by the image carrier 1. Since the processes for developing direct positive plates are well known and such plates are commercially available, no detailed consideration of the development and fixing process is considered to be necessary.

Thus, in accordance with the method of the invention described above, there is prepared a two-piece registering jig bearing like patterns which are accurately positioned with respect to one another through a simple and economical process not requiring any special skill or visual alignment.

FIG. 3 illustrates the manner in which the prepared registering jig is employed to impress like aligned patterns on opposite sides of a work piece 8. The work piece 8 is coated on both sides with a photosensitive reagent resistant material commonly referred to as a "photoresist." The jig elements 3A, 3B, 5A and 5B are reassembled by means of the pins 6A and 6B with the image carrying surfaces of the developed direct positive photographic plate 4 and the image carrier 1 engaging opposite sides of the work piece 8. The photoresist material on the surfaces of the work piece 8 is then exposed through the image carrier and the photographic plate 4, respectively, from the light sources 9 and 10. Although two separate light sources are illustrated in FIG. 3, it will be appreciated that a single light source may be employed merely by exposing one side of the work piece 8 and then turning the entire assemblage to expose the other side of the work piece 8. Since the image carrier 1 and the photographic plate 4 bear aligned images prepared in accordance with the method of the invention, aligned patterns are impressed on opposite sides of the work piece 8 corresponding to the images on the image carrier 1 and the photographic plate 4. These images may either be exactly alike, or may comprise aligned different patterns produced by a process of blocking out portions of the image 2 on the image carrier 1 during the preparation of the photographic plate 4. In any event, the patterns impressed on opposite sides of the work piece 8 are precisely aligned in a simple and effective fashion without requiring any visual alignment procedures.

The two-piece registering jig may next be disassembled and the work piece 8 developed in well known fashion to remove the photoresist material from either the exposed or unexposed regions. Ordinarily, the photoresist material is removed in the unexposed regions so that the pattern formed by the photoresist material upon the work piece 8 is reversed with respect to the images on the image carrier 1 and the photographic plate 4. The work piece 8 is then subjected to an etching process in which an etching reagent removes the material of the work piece 8 in the regions in which the photoresist material has been removed. Since the pattern established by the photoresist material is on both sides of the work piece 8 in accurate alignment, the edges of the etched region are sharply defined and accurately positioned. In the manufacture of articles containing apertures, as, for example, reticles, the etching process may be allowed to continue until the material has been entirely removed clear through the work piece 8 in a pattern the boundaries of which are determined by the presence of the photoresist material. Since the etching takes place from both sides of the work piece 8 simultaneously, a like amount of material may be removed from each side of the work piece 8 during the etching process so that the finished part does not suffer from any mechanical imbalance produced by undercutting during the etching operation.

Although each of the several steps of the method of the invention has been described in detail above, it is intended that the description be, by way of example, only of one way in which the method may be practiced to achieve the fabrication of parts having a high degree of accuracy and precision. Accordingly, the invention should not be limited to the specific steps or arrangements described, but should be considered to include any and all alternatives or modifications falling within the scope of the annexed claims.

We claim:

1. The method of etching aligned patterns on opposite sides of a work piece including in combination the steps of preparing an image carrier bearing a desired pattern, attaching the image carrier to one-half of a two-piece jig, attaching a direct positive photographic plate to the other half of the two-piece jig, joining the halves of the two-piece jig with the image carrier being held in fixed relationship and in contact with the direct positive photographic plate, exposing the direct positive photographic plate through the image carrier, developing the direct positive photographic plate with one-half of the jig affixed thereto, applying a photosensitive, reagent-resistant material to opposite sides of the work piece, joining the two halves of the jig about the work piece with the image carrier and the developed direct positive photographic plate engaging opposite sides of the work piece, exposing both sides of the work piece through the image carrier and the developed direct positive plate, respectively, removing the exposed work piece from the jig, removing the areas on the work piece of the unexposed photosensitive, reagent-resistant material, and etching both sides of the work piece on the areas in which the photosensitive, reagent-resistant material has been removed whereby the etching takes place in aligned patterns on opposite sides of the work piece corresponding to the pattern on the image carrier.

2. The method of etching aligned patterns on opposite sides of a work piece including in combination the steps of preparing a negative image carrier bearing a desired pattern, exposing a first direct positive photographic plate through the image carrier, developing the first direct positive photographic plate, attaching the first photographic plate to one-half of a two-piece registering jig, attaching an unexposed second direct positive photographic plate to the other half of the two-piece registering jig, joining the two halves of the registering jig with the first and second direct positive photographic plates being in contact with one another, exposing the second direct positive photographic plate through the first direct positive photographic plate, developing the exposed second direct positive photographic plate with one-half of the registering jig remaining attached thereto, rejoining the two halves of the registering jig about a work piece having coated surfaces of photoresist material engaging the first and second direct positive photographic plates, exposing the photoresist material on the work piece through the first and second photographic plates, separating the work piece from the jig, developing the photoresist layer to remove the photoresist material from unexposed areas, and etching the unexposed areas of the work piece to produce aligned patterns on opposite sides of the work piece corresponding to the pattern on the image carrier.

3. The method of fabricating parts from a sheet metal work piece including in combination the steps of preparing an image carrier bearing a pattern corresponding to the configuration of the desired part, affixing the image carrier to one-half of a two-piece registering jig, affixing a direct positive photographic plate to the other half of the two-piece registering jig, joining the two-piece registering jig to place the direct positive photographic plate and the image carrier in contact with one another, exposing the direct positive photographic plate through the image carrier, developing the direct positive photographic plate with one-half of the registering jig affixed thereto, rejoining the two halves of the two-piece registering jig in engagement with opposite sides of a work piece bearing a coating of a photosensitive reagent resistant material on each of said opposite sides, exposing both sides of the work piece through the image carrier and the direct positive photographic plate, respectively, separating the work piece from the jig, developing the work piece to remove selected areas of the photosensitive reagent resistant material corresponding to the pattern on the image carrier, and placing the developed work piece in contact with an etching reagent which operates on both sides of the work piece to remove the material from the work piece in the pattern of the image carrier with the boundaries of the etched areas being determined accurately by the developed photosensitive reagent resistant material on the surfaces of the work piece.

4. A method for applying mirror image patterns to opposite sides of a photosensitive work piece including in combination the steps of joining an image carrier bearing a desired pattern to one half of a two-piece jig, joining a direct positive photographic plate to the other half of the two-piece jig, joining the two halves of the jig with the image carrier and the photographic plate being adjacent one another, exposing the direct positive photographic plate through the image carrier, separating the halves of the two-piece jig so that the separated portions remain joined to the image carrier and the photographic plate respectively, developing the exposed direct positive photographic plate, thereafter reassembling the two halves of the two-piece jig about a work piece coated on opposite sides with photosensitive material so that the image carrier and the developed photographic plate are on opposite sides of the work piece, exposing both sides of the work piece through the image carrier and the direct positive photographic plate respectively, and developing the work piece to produce on one side thereof an image corresponding to the pattern on the image carrier and on the opposite side thereof a mirror image of the same pattern, whereby exact registration between the corresponding portions of the respective work piece images is provided.

References Cited in the file of this patent

UNITED STATES PATENTS

| | | |
|---|---|---|
| 2,701,195 | Fleischmann | Feb. 1, 1955 |
| 2,717,833 | Wark | Sept. 13, 1955 |
| 2,762,149 | Mears | Sept. 11, 1956 |

OTHER REFERENCES

Guditz: "Three-Dimensional Printed Wiring," Electronics, Vol. 30, June 1957, pp. 160–163.